United States Patent

Freitas et al.

[11] Patent Number: 5,911,570
[45] Date of Patent: Jun. 15, 1999

[54] FISHING LURE

[76] Inventors: John L. Freitas; Julie G. Freitas, both of 4795 W. Turlock Rd., Snelling, Calif. 95369

[21] Appl. No.: 09/047,744

[22] Filed: Mar. 25, 1998

[51] Int. Cl.$^6$ ..................................... A01K 85/00
[52] U.S. Cl. ................ 43/42.13; 43/42.14; 43/42.17
[58] Field of Search .............. 43/42.11, 42.13, 43/42.14, 42.21, 42.48, 42.17, 42.19, 42.2, 42.5

[56] References Cited

U.S. PATENT DOCUMENTS

| | | | |
|---|---|---|---|
| D. 185,865 | 8/1959 | Herman | 43/42.48 |
| 870,069 | 11/1907 | Wilcox | 43/42.14 |
| 978,290 | 12/1910 | Heatly | 43/42.14 |
| 1,019,926 | 3/1912 | Staples | 43/42.13 |
| 1,295,617 | 2/1919 | Shannon | 43/42.13 |
| 1,923,840 | 8/1933 | Ozburn | 43/42.13 |
| 2,167,945 | 8/1939 | Gilliam | 43/42.13 |
| 2,266,234 | 12/1941 | Mitchell | 43/42.13 |
| 2,459,401 | 1/1949 | Wiitala | 43/42.17 |
| 2,516,133 | 7/1950 | Martin | 43/42.13 |
| 3,120,074 | 2/1964 | Messler | 43/35 |
| 3,890,736 | 6/1975 | Worden | 43/42.11 |
| 4,012,862 | 3/1977 | Dubois | 43/42.11 |
| 4,414,772 | 11/1983 | Duncan | 43/42.36 |
| 4,571,877 | 2/1986 | Montgomery | 43/42.11 |
| 4,794,721 | 1/1989 | Rowe, Jr. et al. | 43/42.14 |
| 4,891,901 | 1/1990 | Baker, Jr. | 43/42.11 |
| 5,016,387 | 5/1991 | Beaupre | 43/42.21 |
| 5,138,789 | 8/1992 | Hood | 43/42.13 |
| 5,355,612 | 10/1994 | Smith | 43/42.13 |

FOREIGN PATENT DOCUMENTS 7373 of 1893 United Kingdom .................. 43/42.21

*Primary Examiner*—Michael J. Carone
*Assistant Examiner*—Damen W. Ark

[57] ABSTRACT

A fishing lure for attracting fish, especially bass. The inventive device includes a body member having front and back ends and arcuate first and second surfaces which form a perimeter edge between them. A first hook is coupled to the back end of the body member. An elongate yoke member having a pair of opposite elongate arms and a midpoint which is coupled to the front end of the body member so that the arms outwardly extend from the longitudinal axis of the body member. Located at each of the arms is a spinning member. Each spinning member has proximal and distal ends, and a pair of wings. The proximal ends of the spinning members are rotationally coupled to their associated arm of the yoke member.

1 Claim, 2 Drawing Sheets

FISHING LURE

BACKGROUND OF THE INVENTION

1. Field of the Invention

The present invention relates to fishing lures and more particularly pertains to a new fishing lure for attracting fish, especially bass.

2. Description of the Prior Art

The use of fishing lures is known in the prior art. More specifically, fishing lures heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing lures include U.S. Pat. No. 5,138,789; U.S. Pat. No. 5,355,612; U.S. Pat. No. 4,414,772; U.S. Pat. No. 3,120,074; U.S. Pat. No. 2,266,234; PCT Patent No. WO 96/39025 (Inventor: Perrick); and EPO Patent No. EP 0 653 155 A1 (Inventor: Rosek).

While these devices fulfill their respective, particular objectives and requirements, the aforementioned patents do not disclose a new fishing lure. The inventive device includes a body member having front and back ends and arcuate first and second surfaces which form a perimeter edge between them. A first hook is coupled to the back end of the body member. An elongate yoke member having a pair of opposite elongate arms and a midpoint which is coupled to the front end of the body member so that the arms outwardly extend from the longitudinal axis of the body member. Located at each of the arms is a spinning member. Each spinning member has proximal and distal ends, and a pair of wings. The proximal ends of the spinning members are rotationally coupled to their associated arm of the yoke member.

In these respects, the fishing lure according to the present invention substantially departs from the conventional concepts and designs of the prior art, and in so doing provides an apparatus primarily developed for the purpose of attracting fish, especially bass.

SUMMARY OF THE INVENTION

In view of the foregoing disadvantages inherent in the known types of fishing lures now present in the prior art, the present invention provides a new fishing lure construction wherein the same can be utilized for attracting fish, especially bass.

The general purpose of the present invention, which will be described subsequently in greater detail, is to provide a new fishing lure apparatus and method which has many of the advantages of the fishing lures mentioned heretofore and many novel features that result in a new fishing lure which is not anticipated, rendered obvious, suggested, or even implied by any of the prior art fishing lures, either alone or in any combination thereof.

To attain this, the present invention generally comprises a body member having front and back ends and arcuate first and second surfaces which form a perimeter edge between them. A first hook is coupled to the back end of the body member. An elongate yoke member having a pair of opposite elongate arms and a midpoint which is coupled to the front end of the body member so that the arms outwardly extend from the longitudinal axis of the body member. Located at each of the arms is a spinning member. Each spinning member has proximal and distal ends, and a pair of wings. The proximal ends of the spinning members are rotationally coupled to their associated arm of the yoke member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing lure apparatus and method which has many of the advantages of the fishing lures mentioned heretofore and many novel features that result in a new fishing lure which is not anticipated, rendered obvious, suggested, or even implied by any of the prior art fishing lures, either alone or in any combination thereof.

It is another object of the present invention to provide a new fishing lure which may be easily and efficiently manufactured and marketed.

It is a further object of the present invention to provide a new fishing lure which is of a durable and reliable construction.

An even further object of the present invention is to provide a new fishing lure which is susceptible of a low cost of manufacture with regard to both materials and labor, and which accordingly is then susceptible of low prices of sale to the consuming public, thereby making such fishing lure economically available to the buying public.

Still yet another object of the present invention is to provide a new fishing lure which provides in the apparatuses and methods of the prior art some of the advantages thereof, while simultaneously overcoming some of the disadvantages normally associated therewith.

Still another object of the present invention is to provide a new fishing lure for attracting fish, especially bass.

Yet another object of the present invention is to provide a new fishing lure which includes a body member having front and back ends and arcuate first and second surfaces which form a perimeter edge between them. A first hook is coupled to the back end of the body member. An elongate yoke member having a pair of opposite elongate arms and a midpoint which is coupled to the front end of the body member so that the arms outwardly extend from the longitudinal axis of the body member. Located at each of the arms is a spinning member. Each spinning member has proximal and distal ends, and a pair of wings. The proximal ends of the spinning members are rotationally coupled to their associated arm of the yoke member.

Still yet another object of the present invention is to provide a new fishing lure that includes spinning members for imitating the movement of the wings of an insect travelling on the surface of the water.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
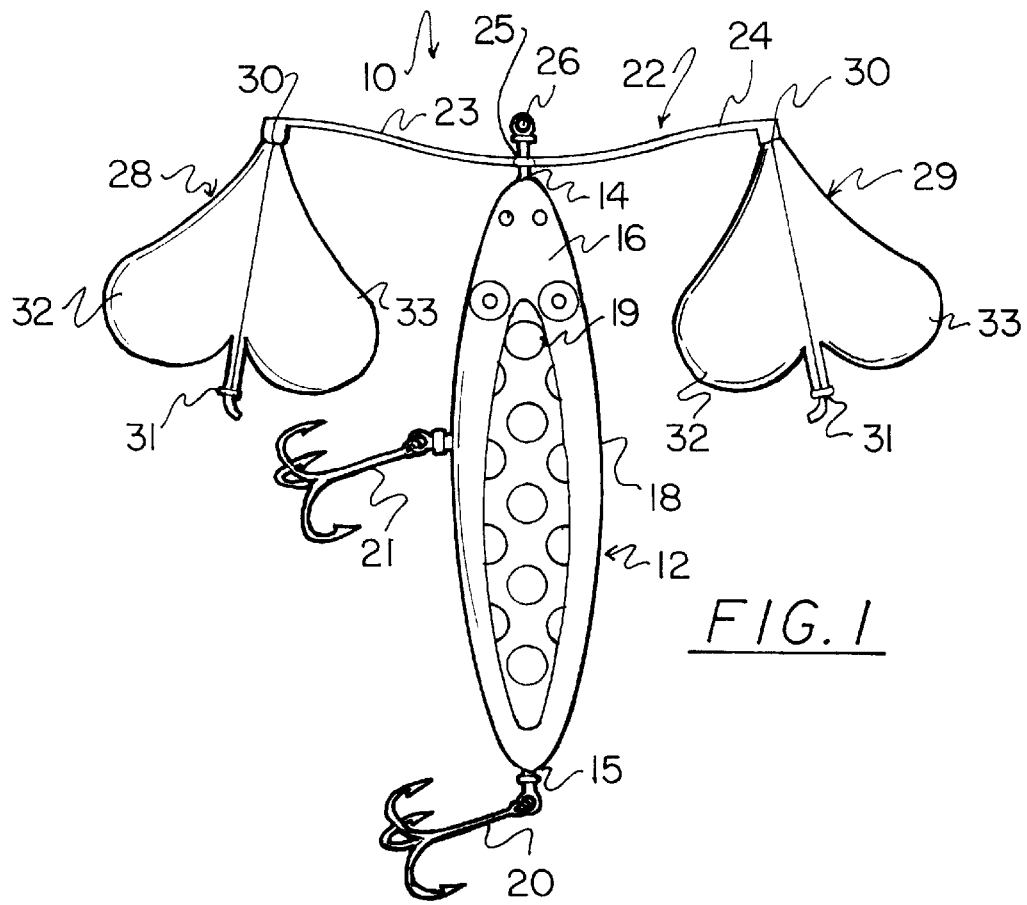
FIG. 1 is a schematic side view of the first surface of a new fishing lure according to the present invention.
Figure 2:
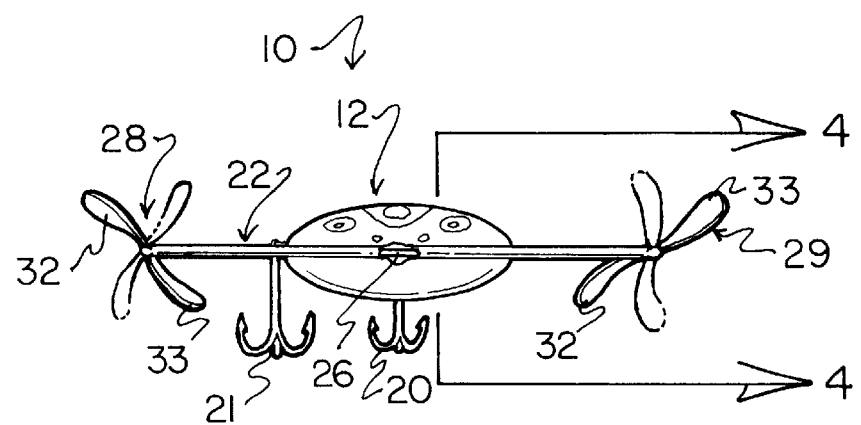
FIG. 2 is a schematic front end view of the present invention.

With reference now to the drawings, and in particular to FIGS. 1 through 4 thereof, a new fishing lure embodying the principles and concepts of the present invention and generally designated by the reference numeral 10 will be described.

As best illustrated in FIGS. 1 through 4, the fishing lure 10 generally comprises a body member 12 having front and back ends 14,15 and arcuate first and second surfaces 16,17 which form a perimeter edge 18 between them. A first hook 20 is coupled to the back end 15 of the body member 12. An elongate yoke member 22 having a pair of opposite elongate arms 23,24 and a midpoint 25 which is coupled to the front end 14 of the body member 12 so that the arms 23,24 outwardly extend from the longitudinal axis of the body member 12. Located at each of the arms 23,24 is a spinning member 28,29. Each spinning member 28,29 has proximal and distal ends 30,31, and a pair of wings 32,33. The proximal ends 30 of the spinning members 28,29 are rotationally coupled to their associated arm of the yoke member 22.

In use, the, fishing lure, 10 is designed for attaching to a fishing line 11 for attracting fish, especially bass. The fishing lure 10 is pulled through the water by the fishing line 11 so that the spinning members 28,29 are spun by the water moving past their wings 32,33. The spinning motion of the spinning members 28,29 appears to be the same type of movement as wings 32,33 on an insect would make as the insect moves over the water.

Specifically, the body member 12 has front and back ends 14,15 and arcuate first and second surfaces 16,17 which form a perimeter edge 18 between them. The body member 12 has a longitudinal axis extending between the front and back ends 14,15 of the body member 12. Preferably, the perimeter edge 18 is generally oval with the first and second surfaces 16,17 each having their concavities facing one another. Preferably, the first surface 16 of the body member 12 has designs 19 thereon adapted for resembling an insect. Ideally, the interior 13 of the body member 12 comprises a water floatable material, such as cork. In the ideal embodiment, the body member 12 has a length defined between the front and back ends 14,15 less than about 4 inches.

The first hook 20 is coupled to the back end 15 of the body member 12 and preferably has three barbs for piercing a fish. In the preferred embodiment, a second hook 21 also having three barbs is coupled to the perimeter edge 18 between the front and back ends of the body member 12.

The elongate yoke member 22 has a pair of opposite elongate arms 23,24 and a midpoint 25 between the arms 23,24. The yoke member 22 is coupled to the front end 14 of the body member 12 at the midpoint 25 with the arms 23,24 outwardly extending generally perpendicular to the longitudinal axis of the body member 12. Each of the arms 23,24 has a terminal end distal the midpoint 25 of the yoke member 22. An attachment loop 26 is extended from the midpoint 25 of the yoke member 22. The attachment loop 26 is adapted for attaching a fishing line 11 thereto.

Figure 3:
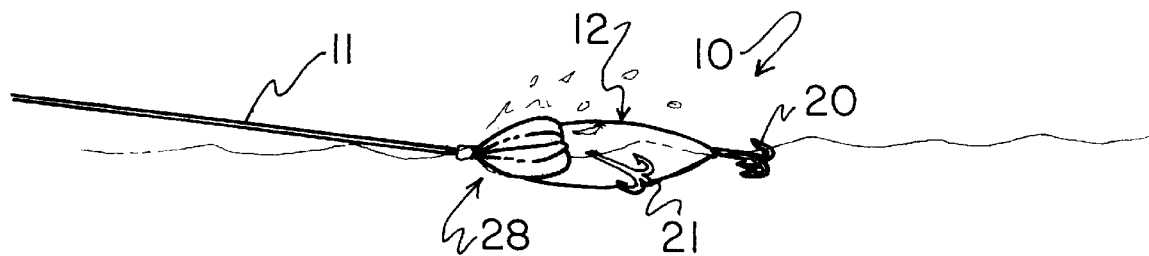
FIG. 3 is a schematic side view of the present invention in use being pulled through the water to spin the spinning members.
Figure 4:
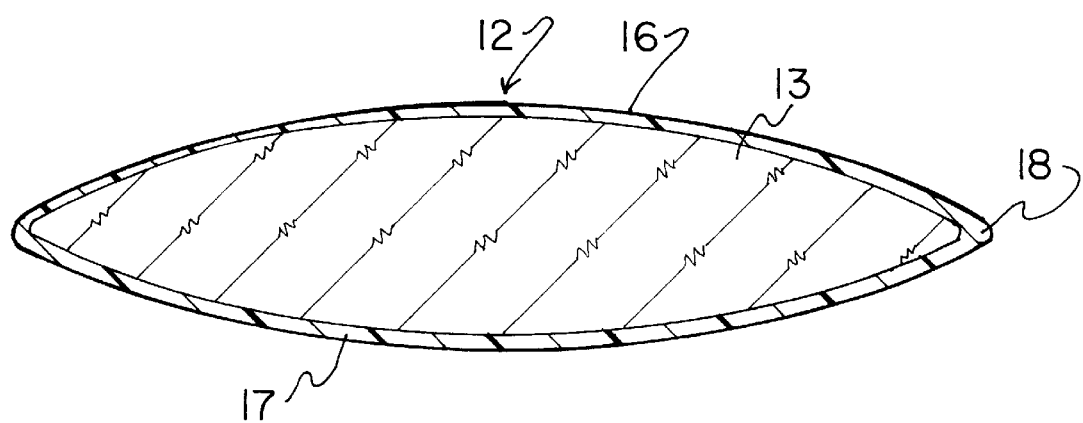
FIG. 4 is a schematic sectional view of the body member of the present invention.

The lure also includes a pair of spinning members 28,29. Each spinning members 28,29 has proximal and distal ends 30,31, a pair of wings 32,33, and a longitudinal axis extending between the proximal and distal ends 30,31. The proximal end of one of the spinning members 28 is rotationally coupled to the terminal end of one of the arms 23 of the yoke member 22 to permit rotation about the longitudinal axis of the spinning member. Similarly, the proximal end of another of the spinning members 29 is rotationally coupled to the terminal end of another of the arms 24 of the yoke member 22 to permit rotation about the longitudinal axis of the spinning member 29. Ideally, the wings 32,33 of each of the spinning members 28,29 has an arcuate portion 34 and a tapered portion 35. The tapered portion 35 is positioned adjacent the proximal end 30 of the associated spinning member while the arcuate portion 34 is positioned adjacent the distal end 31 of the associated spinning member. The wings 32,33 of each the spinning members 28,29 are adapted for rotating the associated spinning member about the longitudinal axis of the spinning member when the front of the body member 12 is pulled through a body of water as illustrated in FIG. 3.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fishing lure, comprising:

a body member having an interior, front and back ends and arcuate first and second surfaces, said first and second surfaces intersecting along a perimeter edge therebetween, wherein the body member has a vertical cross-section along a plane which remains perpendicular with a plane including said perimeter edge with said cross-section having a substantially oval configuration;

said body member having a longitudinal axis extending between said front and back ends of said body member, said perimeter edge being generally oval, said first and second surfaces each having a concavity of a substantially similar uniform radius of curvature, said concavities of said first and second surfaces facing one another, wherein said interior of said body member comprises a water floatable material, wherein said interior of said body member comprises cork;

wherein said body member has a length being defined between said front and back ends, wherein said length of said body member is less than 4 inches;

wherein said first surface of said body member has designs thereon adapted for resembling an insect;

a first hook being coupled to said back end of said body member, said first hook having three barbs;

a second hook being coupled to said perimeter edge midway between said front and back ends of said body member, said second hook having three barbs;

an elongate yoke member having a pair of opposite elongate arms and a midpoint between said arms, said yoke member being coupled to said front end of said body member at said midpoint, said arms being outwardly extended from said longitudinal axis of said body member and slightly forward from said body member, each of said arms having a terminal end distal said midpoint of said yoke member;

an attachment loop being extended from said midpoint of said yoke member, said attachment loop being adapted for attaching a fishing line thereto;

a pair of spinning members, each of said spinning members having proximal and distal ends, a pair of wings, and a longitudinal axis being extending between said proximal and distal ends, said proximal end of one of said spinning members being rotationally coupled to said terminal end of one of said arms of said yoke member such that said spinning members rotate about axes which are skewed outwardly with respect to said longitudinal axis of said body member, said proximal end of another of said spinning members being rotationally coupled to said terminal end of the other of said arms of said yoke member; and wherein the wings of each of said spinning members has an arcuate portion and a tapered portion, said tapered portion being positioned adjacent said proximal end of the associated spinning member, said arcuate portion being positioned adjacent said distal end of the associated spinning member, said wings of each of said spinning members being adapted for rotating the associated spinning member about the longitudinal axis of the spinning member when said front end of said body member is pulled through a body of water, wherein each spinning member has a tail extending rearwardly from said distal end with such tail terminating short of said second hook.

* * * * *